Aug. 18, 1959　　F. C. VAN ARSDELL　　2,899,914
CONTINUOUS GRIDDLE CAKE BAKING APPARATUS
Filed June 28, 1956　　10 Sheets-Sheet 5

INVENTOR.
FRED C. VAN ARSDELL
BY
ATTORNEYS

FIG. 15

INVENTOR.
FRED C. VAN ARSDELL

Aug. 18, 1959   F. C. VAN ARSDELL   2,899,914
CONTINUOUS GRIDDLE CAKE BAKING APPARATUS
Filed June 28, 1956   10 Sheets-Sheet 9

INVENTOR.
FRED C. VAN ARSDELL
BY
ATTORNEYS

United States Patent Office 2,899,914
Patented Aug. 18, 1959

2,899,914

CONTINUOUS GRIDDLE CAKE BAKING APPARATUS

Fred C. Van Arsdell, Medina, Ohio, assignor to The Quaker Oats Company, Chicago, Ill., a corporation of New Jersey Application June 28, 1956, Serial No. 594,613

14 Claims. (Cl. 107—4)

The invention relates generally to machines for automatically baking griddle cakes and the like continuously, and more particularly to a machine having a series of moving griddles for rapidly cooking a large quantity of cakes on one side, and turning and cooking them on the opposite side, as the griddles move along an endless conveyor.

Certain prior machines for cooking griddle cakes have had griddles of large area on which the cakes are turned for cooking on both sides, and others have utilized one or a group of griddles on which the cakes are cooked on one side and another like group onto which the cakes are turned or flipped for cooking on the other side. The capacity of both such types of machines is limited, the first by the practical limits of the size of the griddle, and the second by the complexity and expense of operating a large number of griddles simultaneously as well as the excessive floor space required.

The purpose of the present invention is to overcome these disadvantages and provide a machine which will continuously and economically turn out a large quantity of cooked griddle cakes. The present apparatus comprises a series of griddles mounted on an endless conveyor, each griddle cooking a plurality of cakes, and the griddles are successively loaded with measured amounts of batter, heated to cook the batter on one side, inverted over an adjacent griddle and scraped to drop thereon cakes cooked on one side, and scraped again after another cooking period to remove and discharge the completely cooked cakes, all as the griddles are moved progressively along the conveyor.

Other objects include the provision of an improved machine which is entirely automatic from the charging of measured amounts of batter on each griddle to the removal of fully cooked cakes therefrom, which is compact and efficient, and which is easily regulated to control the amount of cooking of the cakes and the number of cooked cakes produced per unit of time.

These and other drawings are accomplished by the improved apparatus comprising the present invention, a preferred embodiment of which is shown by way of example in the accompanying drawings, and described in detail herein. Within the scope of the appended claims and mechanical equivalents not precluded by the prior art, various modifications and detailed changes in construction are intended to be included.

Referring to the drawings.

Figure 1:
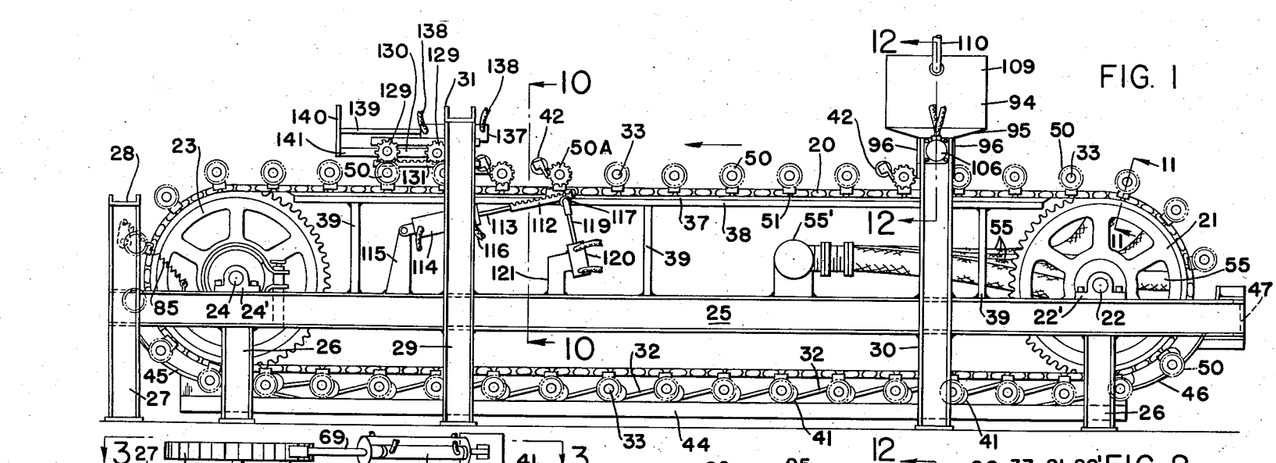
Fig. 1 is a side elevation of an embodiment of the improved machine, some of the parts thereof being shown somewhat schematically for the sake of clarity.
Figure 2:
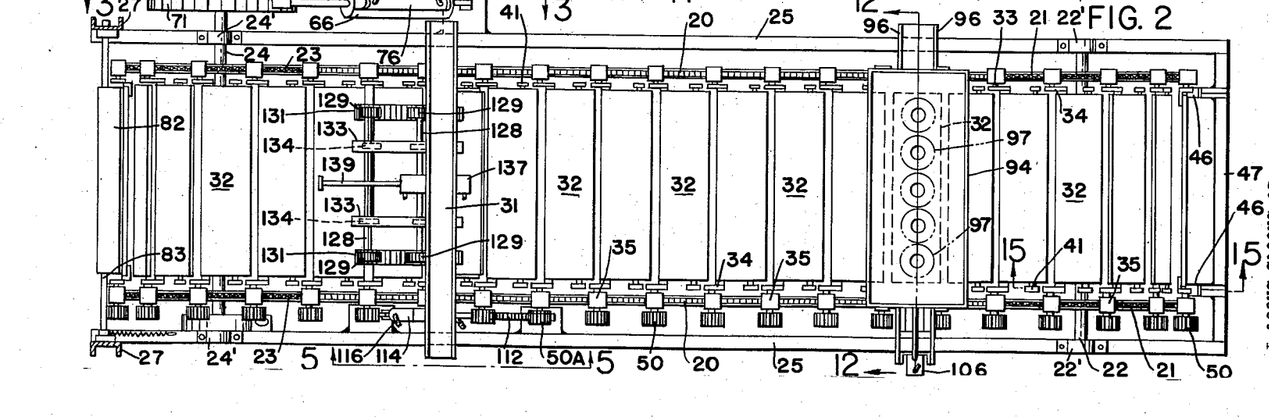
Fig. 2 is a top plan view thereof.

Referring to Figs. 1 and 2, the improved machine preferably includes two laterally spaced endless conveyor chains 20 passing over idler sprockets 21 mounted on a shaft 22 at one end of the machine, and passing over driven sprockets 23 mounted on a shaft 24 at the opposite end. The bearings 22' and 24' for both shafts 22 and 24 are supported on channel frame members 25 extending horizontally along the sides of the conveyor and supported immediately under the shafts by channel posts or columns 26.

At the discharge end of the conveyor, adjacent to the sprockets 23, the ends of frame members 25 are connected to upright channels 27 resting on the floor and extending upwardly beyond the frame members. Preferably, the upper ends of channels 27 are connected by a transverse channel frame member 28. At spaced locations between the posts 26, upright channel frame members 29 and 30 are connected to the side frame members 25. The upright channel members rest on the floor and extend upwardly above the upper run of the conveyor. Channel members 29 have their upper ends connected by a cross channel 31.

Griddle plate construction

A series of transverse griddle plates 32 is carried on the conveyor chains at closely spaced equal intervals longitudinally of the conveyor. The length of the plates is preferably such as to cook a plurality of batter cakes in side-by-side relation, and the particular length shown is designed for five cakes, although the length may be varied to accommodate a different number, as desired. The plates 32 each have pivot shafts at their ends extending transversely adjacent their forward edges, and the shafts are journaled on the conveyor chains. Referring to Figs. 7–11, the pivot shafts 33 are connected to the ends of each plate 32 by angle brackets 34 secured to the front corners of the plate. Each shaft 33 is journaled in a bearing block 35 mounted on a chain 20 by angle brackets 36.

The conveyor chains 20 are preferably roller chains of well-known construction and along their upper runs the chains roll on rails 37 carried on longitudinal track sections 38 supported on the T-shaped angle brackets 39 secured at their lower ends to frame members 25 (Fig. 10) and extending upwardly therefrom. Along their inner edges the track sections 38 have raised portions 40 for supporting rollers 41 mounted on the rear corners of the griddle plates 32.

Figure 3:
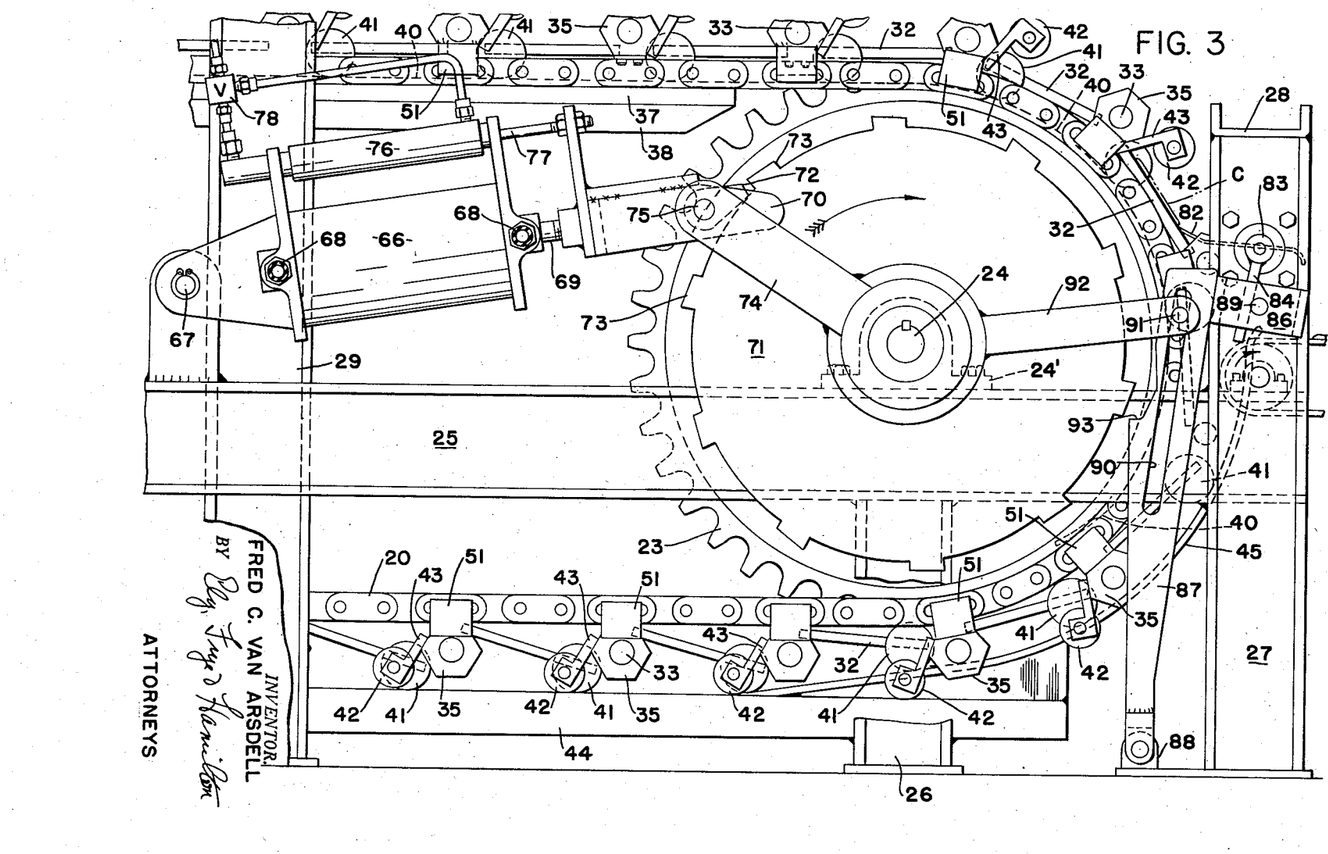
Fig. 3 is an enlarged fragmentary elevation of the discharge end of the machine on line 3—3 of Fig. 2, showing the indexing mechanism at the start of its forward stroke.
Figures 7, 8, 9:
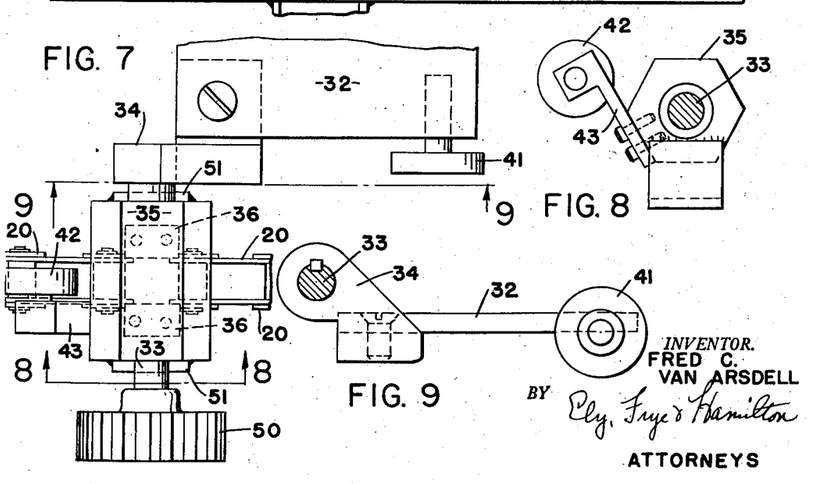
Fig. 7 is a partial plan view taken on line 7—7 of Fig. 11, showing the manner of supporting one end of a griddle plate on the conveyor.
Fig. 8 is a sectional view on line 8—8 of Figs. 7 and 11.
Fig. 9 is a sectional view on line 9—9 of Figs. 7 and 11.

As seen in Figs. 3, 7 and 8 each bearing block 35 has an offset guide roller 42 mounted thereon by means of a bracket 43, and along the return run of the conveyor these rollers are supported on longitudinal tracks 44 secured to the frame members 26, 29 and 30. As shown in Fig. 3 curved tracks 45 for the rollers 41 are connected to the front ends of the tracks 44 for making the conveyor chains hug the lower portions of sprockets 23. Similarly, curved tracks 46 are connected to the rear ends of the tracks 44 (Fig. 15) for supporting the rollers 41 as the chains move upwardly onto the sprockets 21. The upper end of tracks 46 may be secured to a cross channel 47 extending between side channels 25. Upper curved rails 48, which merge with the upper rails 37, are mounted on the sprocket shaft 22 by arms 49, for supporting the rollers 41 as the conveyor chains pass over sprocket 21.

All of the pivot shafts 33 at one end of the griddle plates 32 have spur pinions 50 on their outer ends, and these gears are utilized to rotate the successive plates on their pivot shafts when they arrive at the inverting station in order to turn the cakes and drop them on the next adjacent plate, as will hereinafter be described. Also, the bearing blocks 35 at both ends of each plate have depending, inturned flanges 51 (Figs. 10 and 11) for slidably interlocking with outturned flanges 52 on the track section 38 at the turning station, for preventing the plate 32 from being lifted during the turning operation.

The indexing mechanism, which will be described in detail later on, is arranged to advance the conveyor step-by-step a distance equal to the distance between the centerlines of adjacent griddle plates, or in other words a distance of one plate interval. Accordingly, at the end of each forward stroke of the indexing mechanism, each plate occupies the temporarily stationary position just vacated by the next forwardly adjacent plate.

*Griddle plate heating means*

Figure 15:
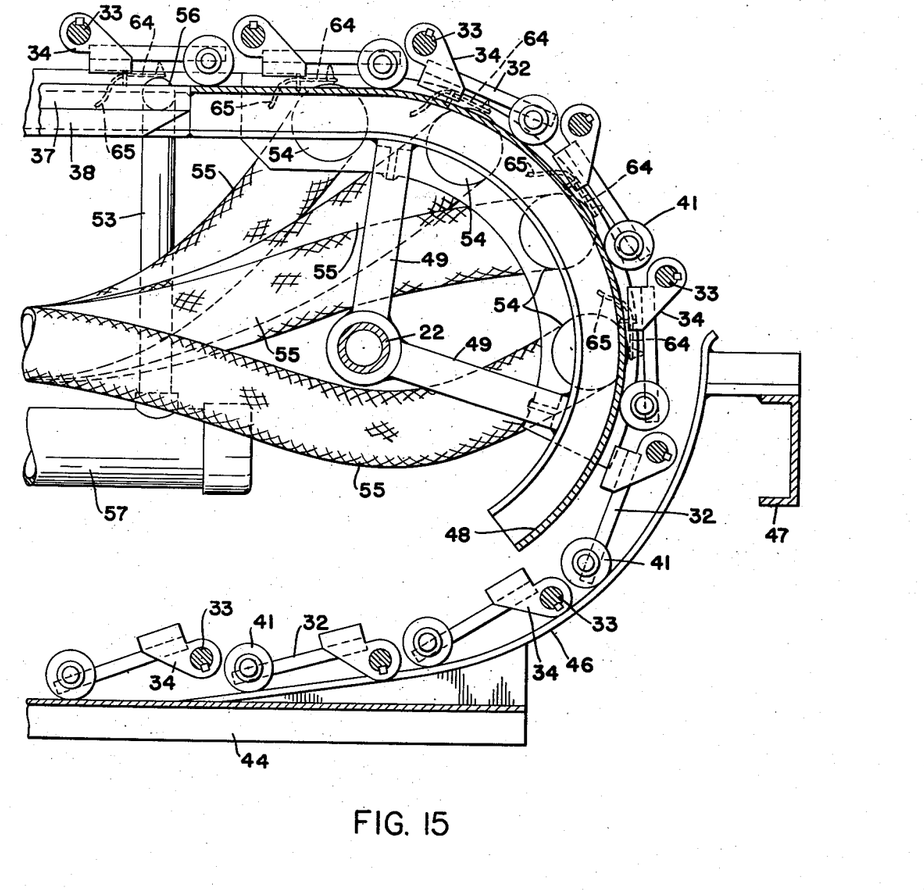
Fig. 15 is an enlarged side view on line 15—15 of Fig. 2, showing the preheating arrangement for the griddle plates in advance of the batter metering device.
Figure 16:
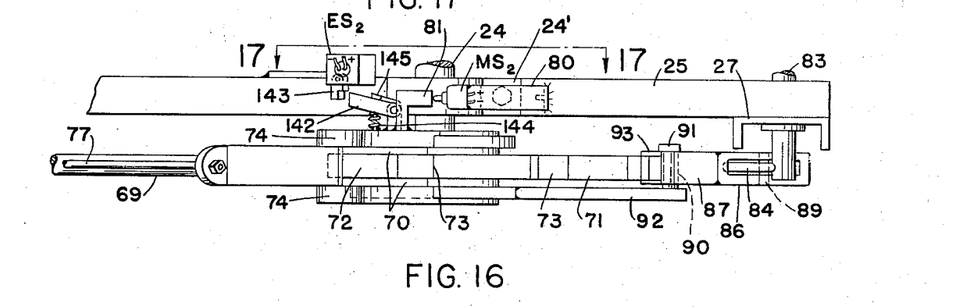
Fig. 16 is a fragmentary plan view of the indexing mechanism on line 16—16 of Fig. 4.
Figure 17:
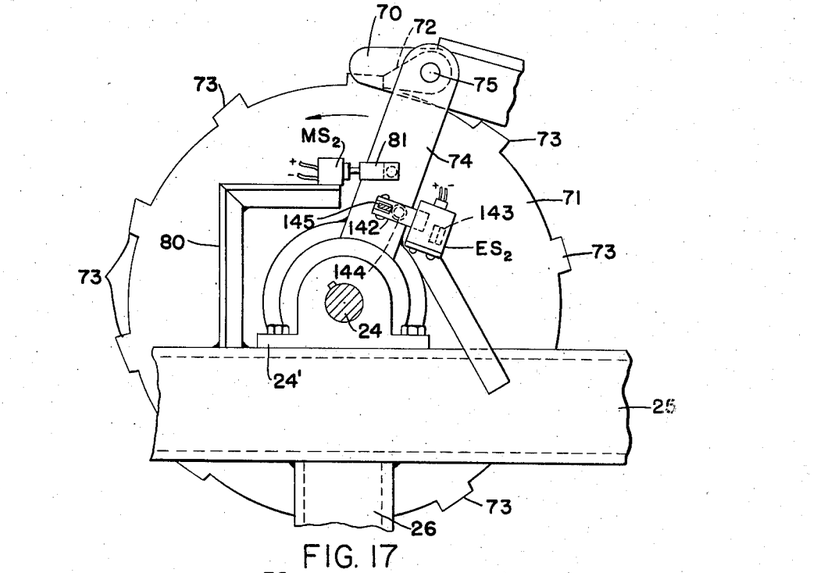
Fig. 17 is a side view thereof taken on line 17—17 of Fig. 16.

The plates may be heated and maintained at cooking temperature by various means, and in the illustrated embodiment linear gas burners are located under a number of the temporarily stationary positions of the plates. At the rear end of the conveyor, the plates may be preheated as they ride over the idler sprockets 21, and for this purpose a plurality of large size linear tubular burners 54 extending transversely of the conveyor may be provided at several temporarily stationary plate positions (Fig. 15). These burners may be supplied through conduits 55 with a combustible air-gas mixture supplied from a pressurized supply manifold 55′ (Fig. 1), to force the flames laterally outward against the plates positioned along the curve of the sprockets.

Figures 10, 11:
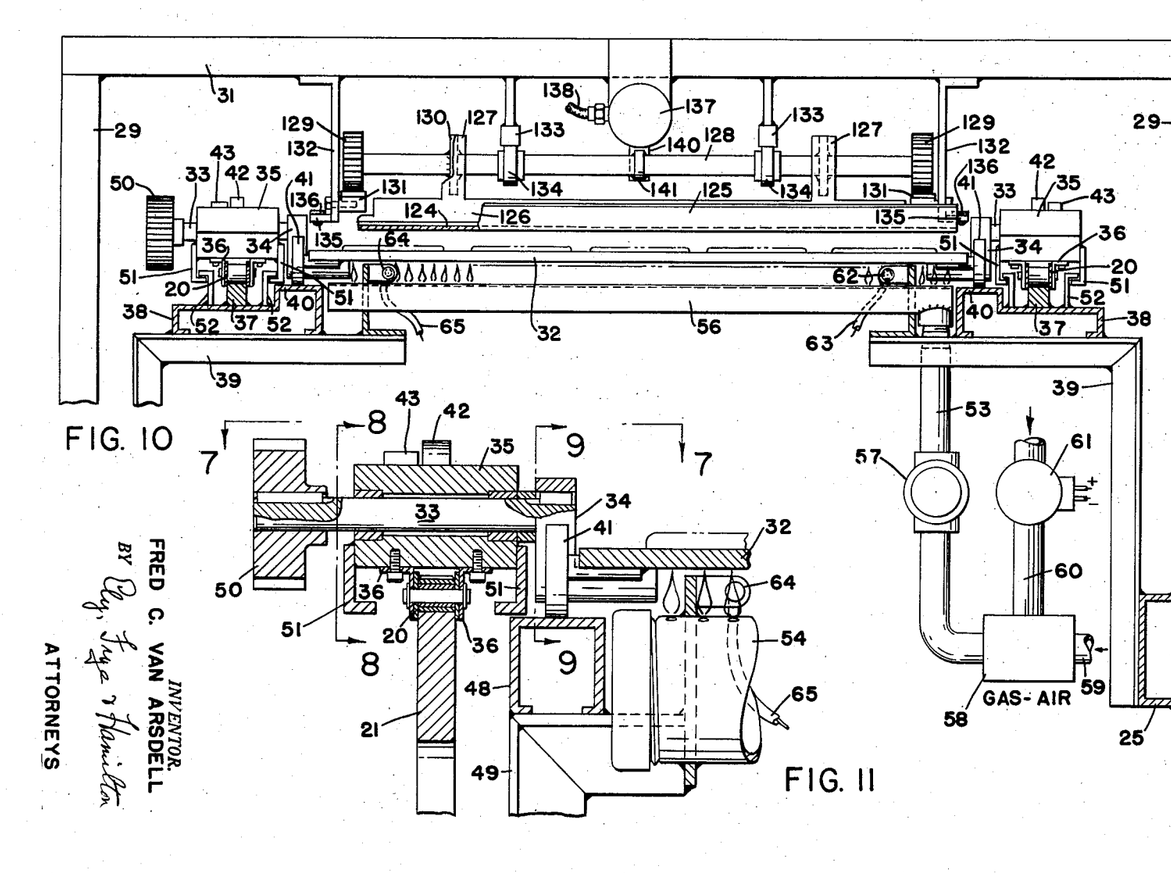
Fig. 10 is a transverse sectional view of the machine on line 10—10 of Fig. 1.
Fig. 11 is an enlarged fragmentary sectional view on line 11—11 of Fig. 1.

Linear tubular burners 56 extending transversely of the conveyor are provided one for each temporarily stationary plate position substantially throughout the entire upper run of the conveyor. Referring to Fig. 10, banks of the burners 56 may be connected by pipes 53 to a manifold 57 which receives a combustible mixture of gas and air from the aspirator 58 having an air supply connection 59 and a gas supply connection 60 controlled by a solenoid valve 61. Each burner tube 54 and 56 has at the end connected to the manifold, a spark-producing element 62 which is electrically connected by conductor 63 to a starting switch at the control panel. At the opposite end each burner has a flame-sensitive rod element 64 in the area of the burner flame and electrically connected by conductor 65 in circuit with suitable electronic devices for controlling the operation of the solenoid valve 61 by the presence of a flame acting on the rod 64.

The electronic system for controlling ignition of the gas burners is conventional and per se forms no part of the present invention. Suffice it to state that when a combustible gas-air mixture is supplied to the burners a spark is produced at element 62, igniting the burner flame at that point. This flame starts the progressive ignition of a series of burner flames at burner openings extending along the tube to the flame-sensitive rod 64 at the other end. If the progressive ignition fails and the flame-sensitive rod is not heated within a predetermined time, the valve 61 controlling the gas to that particular bank of burners is shut off and an alarm signal is operated. The same thing occurs if the flame is extinguished for any reason. The amount of gas-air mixture delivered to the burners is manually regulated according to varying conditions of temperature, humidity, etc.

*Indexing mechanism*

As previously stated, the indexing mechanism advances the conveyor a distance equal to the spacing between the center lines of the griddle plates for each stroke. Referring to Figs. 3, 4, 16 and 17, an indexing cylinder 66 is pivotally mounted at 67 on horizontal frame member 25 adjacent to the sprocket 23 on the opposite side of the conveyor from the spur pinions 50. The cylinder 66 is a fluid or air cylinder having fluid conduits 68 connecting its ends with a well known type of solenoid control valve (shown schematically in Fig. 19) for controlling the flow to and from the cylinder. When the solenoid $S_1$ is de-energized a constant fluid pressure acting in the opposite direction on the valve piston returns it and reverses flow to and from cylinder 66. The constant fluid pressure which returns the valve piston is less than that controlled by the solenoid. The piston rod 69 operated by the cylinder has at its outer end a yoke, the arms 70 of which straddle the outer rim of a ratchet wheel 71.

Pivoted between the yoke arms 70 is a ratchet pawl 72 which is adapted to engage behind one of the teeth 73 on the wheel 71 on the forward stroke of piston rod 69, and to ratchet over the next rearwardly adjacent tooth 73 on the return stroke. Radius arms 74 attached to the hub of the wheel 71 are pivotally connected at their outer ends to the pivot connection 75 of the pawl, so as to cause the pawl 72 to follow the rim of wheel 71.

Figure 4:
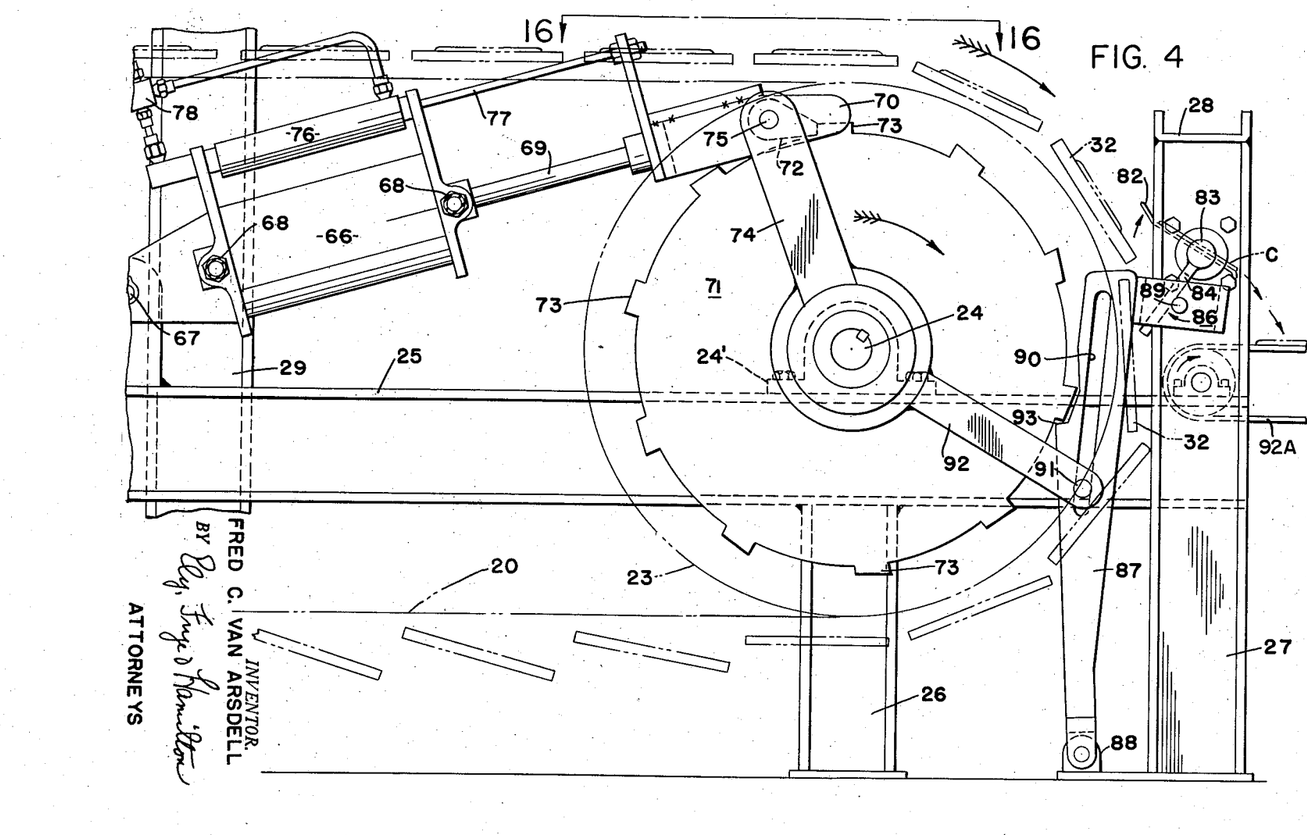
Fig. 4 is a similar view showing the indexing at the end of its forward stroke.

At the start of the forward stroke of piston rod 69, the pawl engages behind a tooth 73 and indexes the wheel 71 clockwise, as viewed in Fig. 3, a distance of one tooth to the position of Fig. 4. This movement of wheel 71 moves the conveyor forwardly a distance equal to the longitudinal spacing between centerlines of the griddle plates, otherwise stated as one plate interval. On the return stroke the pawl 72 ratchets over the next rearwardly adjacent tooth 73 and the stroke carries the pawl slightly beyond the tooth to allow it to drop behind the same. This results in the clearance between the pawl and tooth shown in Fig. 3.

As the piston rod nears the end of its forward stroke a fluid cushioning device 76, carried on the cylinder 66 and having its piston rod 77 connected to the piston rod 69, is operated to retard and cushion the movement of the piston rod 69. The device 76 is well known by the trade name "Hydrocheck," and has a piston and fluid conduits forming a closed fluid circuit to opposite ends of its cylinder, flow through which circuit is controlled by a valve 78 to restrict the flow in one direction. The valve 78 may be operated by a micro-switch $MS_2$ mounted on a bracket 80 on the frame member 25 (Figs. 16 and 17), the switch being actuated by a lug 81 secured on the inner yoke arm 74 and projecting inwardly therefrom. The solenoid valve controlling the operation of the index piston is actuated at properly timed intervals, in a manner later described. As the index piston is actuated to advance the conveyor, the piston in cylinder 76 is moved with it, and when the switch MS₂ is actuated by forward movement of the index piston, the valve 78 is operated to restrict flow through the cylinder 76 and cushion the remainder of the forward stroke.

*Cake removing means*

As shown in Figs. 3 and 4, the spatula or scraper means for removing the fully baked cakes from successive griddle plates may be operated by the ratchet wheel 71. The spatula 82 may be a single plate coextensive with the griddle plates, or a plurality of parallel elements, secured on a rocker shaft 83 journaled in the upright frame members 27 at the discharge end of the conveyor. The end of the shaft 83 adjacent to ratchet wheel 71 has a depending actuator finger 84 secured thereon, and the opposite end of the shaft has a lever secured thereon which is connected to a tension spring 85 attached to the frame (Fig. 1) for urging the inner end of the spatula 82 against the lower portion of an adjacent griddle plate 32 in the position shown in Fig. 3, immediately below the cakes C which have been baked thereon.

The actuator finger 84 extends into a slotted ear 86 projecting forwardly from the upper end of a lever arm 87 pivoted at its lower end on a bracket 88 at the base of the frame. A transverse pin 89 extending through the ear 86 engages the finger 84. An elongated cam slot 90 is provided longitudinally of the lever arm 87, and the slot slidably receives a pin 91 on the end of a radius arm 92 secured to the hub of ratchet wheel 71.

Accordingly, as the ratchet wheel 71 is moved clockwise on the forward stroke of the indexing piston, the pin 91 riding in slot 90 pivots the arm 87 and ear 86 rearwardly and the pin 89 rotates the rocker shaft 83 and the spatula mounted thereon in a clockwise direction. Thus the inner end of the spatula scrapes the downcoming plate 32 to lift the cakes C therefrom (Fig. 4) and slide them downwardly onto a conveyor 92A which may carry them to a fast freeze compartment.

At the end of the forward stroke, the lever arm 87 has moved back close to the ratchet wheel 71, and a shoulder 93 on the arm is positioned under one of the teeth 73 to provide a positive stop for the wheel at the end of the forward stroke.

*Batter dispensing device*

Referring to Figs. 1 and 2, as the griddle plate 32 advance step-by-step from the preheat burners at the rear of the conveyor they are additionally heated at each temporarily stationary position along the upper run of the conveyor by burners 56 to bring them up to proper temperature by the time they reach the batter dispensing station. The batter metering and dispensing device preferably includes a batter tank or reservoir 94 extending transversely over the conveyor between the upright channel frame members 30. The tank is located relative to the conveyor so that at the end of each forward stroke of the indexing mechanism, a griddle plate 32 occupies a temporarily stationary position immediately below the tank, as indicated in Fig. 2.

Figure 12:
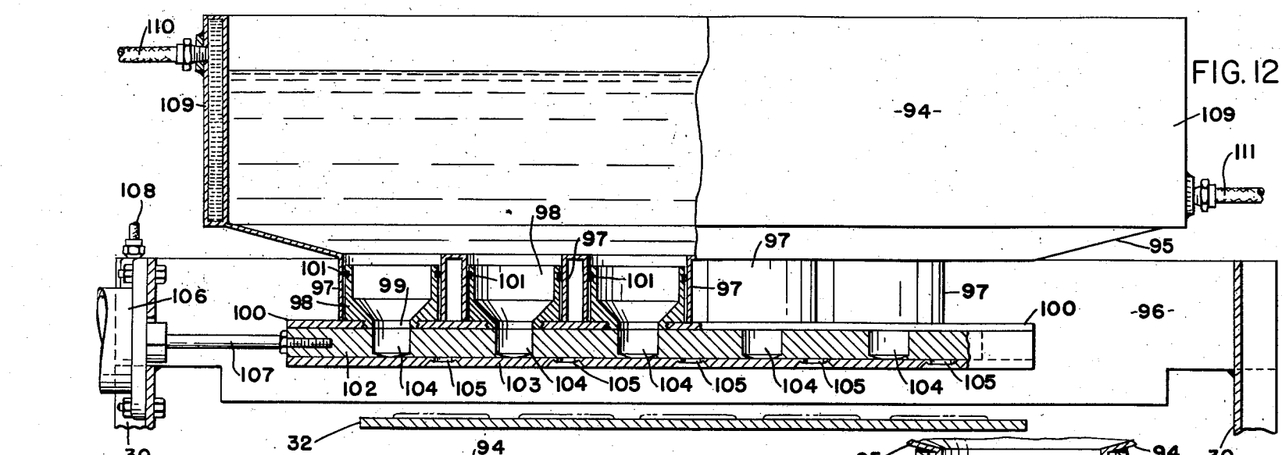
Fig. 12 is an enlarged fragmentary sectional view on line 12—12 of Figs. 1 and 2, showing the batter metering device in measuring position.
Figure 13:
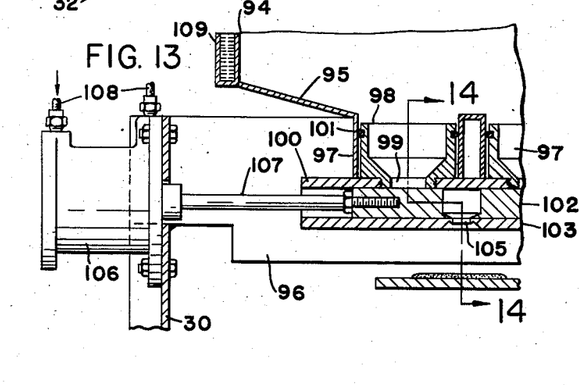
Fig. 13 is a similar fragmentary view showing the batter metering device in discharging position.
Figure 14:
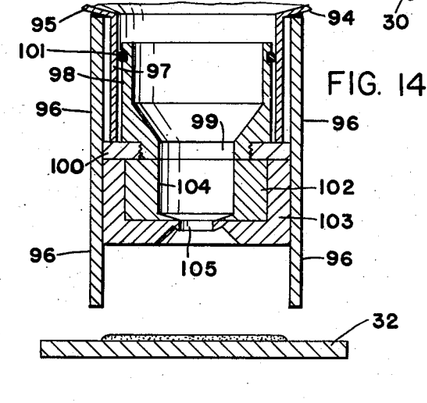
Fig. 14 is a transverse sectional view on line 14—14 of Fig. 13.

Referring to Figs. 12–14, the tank 94 preferably has an inwardly converging lower portion 95 supported on the top edges of two spaced-apart plates 96 secured at their ends to the channels 30 and extending transversely over the conveyor. The converging portion 95 merges into five identical cylindrical discharge compartments 97 spaced equally across the conveyor, one compartment for each charge of batter to be deposited on a griddle plate. The compartments 97 are open at the bottom, and each one slidably receives a discharge throat or chute 98 the bottom shouldered end of which has a discharge opening 99 and is secured in a horizontal mounting plate 100.

O-rings 101 provide a seal between each discharge throat and its compartment.

A horizontal metering bar 102 slidably abuts the underside of plate 100, and bar 102 is slidably mounted for reciprocatory movement transversely of the conveyor in a dispensing channel member 103 mounted on plates 96. The metering bar has five metering openings 104 therein for registering with the openings 99 in the discharge throats in the normal non-dispensing position of the bar. The bottom wall of the dispensing channel has five dispensing ports 105 which are normally staggered with respect to the metering openings 104, as shown in Fig. 12, and which register with the metering openings when the bar 102 is slid to dispensing position as shown in Fig. 13. The dispensing ports 105 are properly located over each griddle plate temporarily stopped thereunder to deposit five charges of batter thereon at equally spaced positions.

In the non-dispensing position of the metering bar shown in Fig. 12, the openings 104 are filled from the tank 94 with measured charges of batter, and when the bar is slid to the dispensing position of Fig. 13, the tops of openings 104 are closed off by bar 100 and the bottoms register with dispensing ports 105, so as to deposit five measured charges of batter on the griddle plate below. The ports 105 are shaped as shown in Fig. 14 so as to substantially prevent dripping after being closed.

The means for reciprocating the metering bar 102 preferably comprises a fluid cylinder 106 mounted on one of the channels 30 and having its piston rod 107 attached to the end of the bar 102. Fluid conduits 108 are connected to the ends of the cylinder 106 and fluid flow to and from the cylinder through the conduits 108 is controlled by a suitable solenoid valve 106V, having inlet and outlet pipes 160A and 160B (Fig. 19) to move the piston rod 107 forward and reverse. The valve 106V is operated in timed relation with the movement of the conveyor in a manner to be described.

As indicated in Fig. 12, the tank 94 may be provided with an outer jacket 109, in which a liquid medium may be circulated through pipe connections 110 and 111, for maintaining the batter in the tank substantially at a desired temperature.

*Griddle plate turning mechanism*

As the griddle plates 32 advance beyond the batter dispensing station with the measured charges of batter thereon, they are continuously maintained at cooking temperature by the burners 56 at each temporarily stationary position of the plates. When each plate reaches a position where the charges of batter now formed into cakes are properly cooked on the under side, the cakes are turned for cooking on the other side. As seen in Figs. 1 and 2, the turning station is located opposite the upright channel frame members 29. Obviously, the length of the conveyor between the batter dispensing station and the turning station may be varied, as may the distance between the rear end of the conveyor and the dispensing station, depending upon the rate of advance of the conveyor and the rate of heating the griddle plates.

Figure 5:
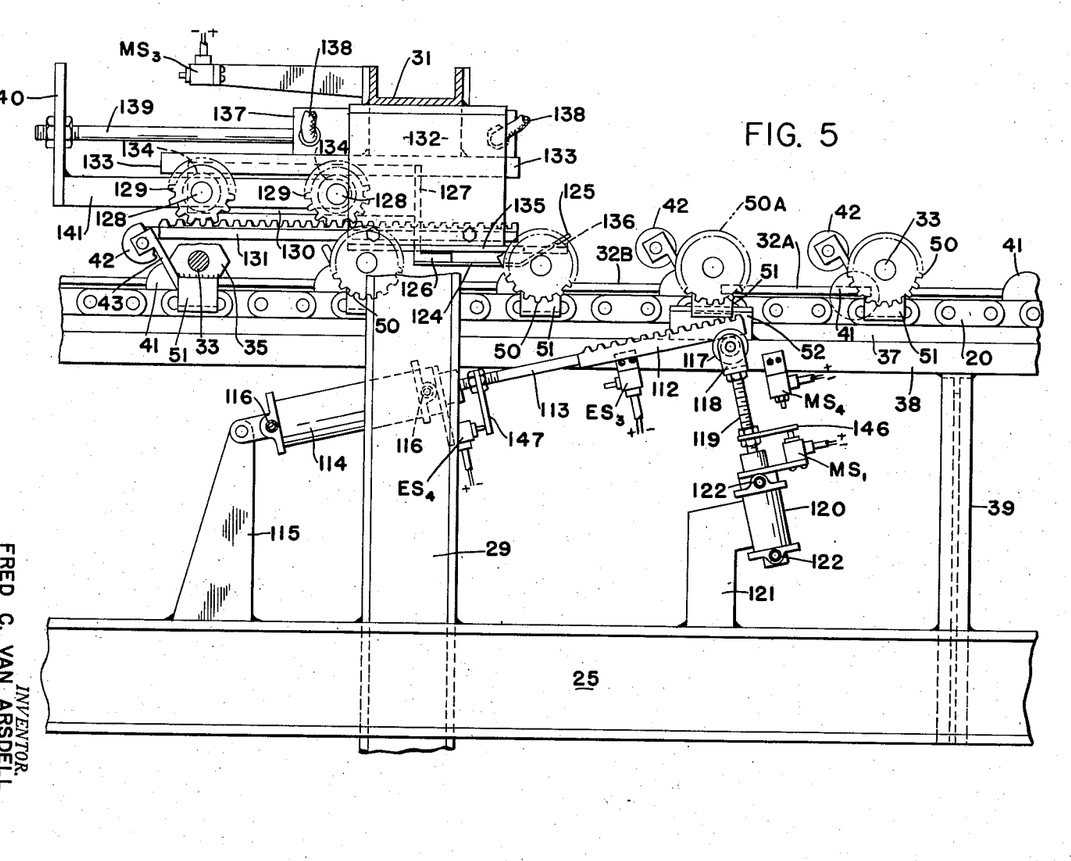
Fig. 5 is an enlarged fragmentary view on line 5—5 of Fig. 2, showing the griddle turning mechanism at the start of its stroke.
Figure 6:
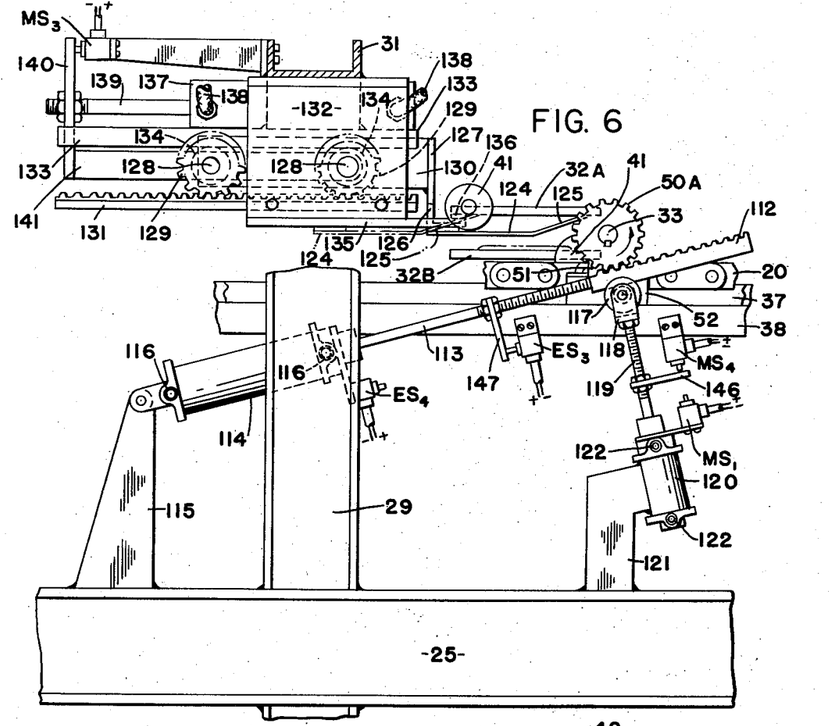
Fig. 6 is a further enlarged view similar to Fig. 5, showing the griddle turning mechanism at the end of its stroke.

Referring particularly to Figs. 5 and 6, the turning mechanism includes a rack 112 mounted on the end of the piston rod 113 of a fluid cylinder 114, and adapted to become meshed in succession with the pinions 50 on the ends of the griddle plate pivot shafts 33 as each plate reaches the turning station. The cylinder 114 is pivotally supported at one end on a bracket arm 115 on frame member 25, and has fluid conduits 116 connected to its ends, flow through which is controlled by a suitable solenoid valve 114V similar to valve 106V (Fig. 19) operated in the same manner as solenoid valve 106V controls cylinder 106, and valve 114V is in timed relation to the conveyor in a manner to be described.

The rack 112 is movably supported on a roller 117 journaled in a yoke 118 on the end of the piston rod 119 of a fluid cylinder 120 carried on a bracket 121 on frame member 25. Normally, the rack is supported by piston rod 119 in an inoperative position relative to the pinions 50, as shown in Fig. 5. The cylinder 120 has fluid conduits 122 connected to its ends, flow through which conduits is controlled by a suitable solenoid valve 120V similar to valve 106V (Fig. 19), which is operated in timed sequence by the indexing mechanism in a manner to be described, to raise the piston rod 119 and mesh the rack with a pinion 50.

When the rack 112 is meshed with the pinion 50A positioned above the rack and carried on plate 32A, as seen in Fig. 5, and the rack is then moved linearly to the right by piston rod 113 to the position of Fig. 6, the plate 32A is rotated through 180° to the inverted position immediately above the next forwardly adjacent griddle plate 32B. Normally, the cakes will stick to plate 32A, even when inverted, and accordingly scraper or spatula means is provided for freeing the partly cooked cakes from successively inverted plates and allowing them to drop on the plate below.

The scraper or spatula element may be a plate 124 extending transversely substantially coextensively with the griddle plates, and having an upturned rear edge 125 for scraping across the underside of an inverted griddle plate in the position of 32A in Fig. 6. The spatula plate 124 is secured at its forward edge to a transverse angle 126 having transversely spaced, upwardly extending flanges 127 (Fig. 10) attached to a reciprocating carriage embodying longitudinally spaced transverse shafts 128 which have spur pinions 129 journaled on their ends. The flanges 127 may be welded to the rear edges of longitudinally extending bars 130 which are fixed to the shafts 128.

The pinions 129 mesh with rack bars 131 mounted on angle plates 132 which are secured to and depend from the transverse channel frame member 31. Upper rails 133 suspended from channel 31 abut rollers 134 journaled on the shafts 128 to provide hold-downs for the carriage. Bumper supporting bars 135 may be secured to the lower edges of the angle plates 132 and extend rearwardly therefrom. Cushion elements 136 on the rear ends of bars 135 are contacted by the corners of each griddle plate as it reaches the end of its inverting movement in the position of Fig. 6.

The means for reciprocating the carriage preferably comprises a fluid cylinder 137 supported on channel beam 31 and having fluid connections 138 at its ends, the flow through which connections is controlled by a suitable solenoid valve 137V similar to valve 106V (Fig. 19) operated in proper sequence relative to the turning mechanism in a manner to be described. The piston rod 139 of cylinder 137 extends forwardly and is connected with a cross head 140 mounted on the front end of a horizontal bar 141 secured to the central portions of shafts 128. By having two shafts with spur pinions 129 meshing with the racks 131, proper alignment of the carriage is maintained at all times.

*Operation*

The operation cycle of the apparatus is started by a conventional electric timer mechanism (not shown) which may have a cam shaft making one revolution for each operation cycle. A cam on the shaft closes a starting switch hereinafter referred to as $TS_1$, which actuates the solenoid $S_1$ of valve 66V controlling index cylinder 66 and the piston rod 69 moves the ratchet wheel 71 forwardly one stroke. Near the end of the forward stroke, the microswitch $MS_2$ is actuated, operating the fluid cushioning device 76 in the manner previously described. After a predetermined time interval (which may be of the order of 1.5 seconds) the timer switch is opened and the solenoid valve causes the piston rod 69 to return, moving the ratchet pawl 72 back over the next rearwardly adjacent tooth 73.

Figure 18:
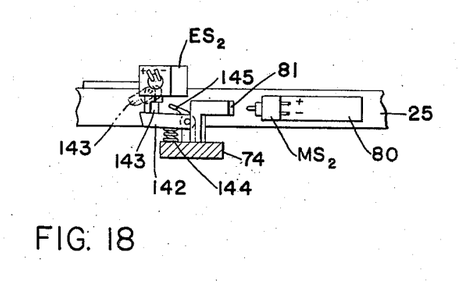
Fig. 18 is a fragmentary view similar to Fig. 16, showing part of the indexing mechanism during the return stroke.

During the return stroke of the radius arm 74, a spring-pressed dog 142 pivoted on the arm actuates an electro snap or impulse switch $ES_2$ of known construction (Figs. 16–18) which operates the rack lifting cylinder 120 on the opposite side of the conveyor. The switch $ES_2$ is mounted on frame member 25 and has a notched switch arm 143 which is pivoted on the switch so that it can be moved by dog 142 in only one direction, i.e., the return direction of arm 74. Thus, on the forward stroke the dog 142 slides over the switch arm 143 as the spring 144 yields without actuating the switch. On the return stroke, the dog, held against a stop 145 by the spring, engages the switch arm and momentarily closes the switch to energize the solenoid valve which operates the rack lifting piston rod 119 to raise the rack 112 into mesh with the pinion 50A immediately above. The same switch $ES_2$ operates the batter dispensing cylinder 106 to move the dispensing bar 102 and deposit measured charges of batter on the griddle plate 32 below the batter tank 94. The return of the batter dispensing bar is controlled by a second timer switch referred to as $TS_2$ which is actuated by a second cam on the timer shaft and is set to operate within the cycle and before the next advance stroke of the indexing mechanism. The timing of the return stroke of the dispenser is thus adjustable within limits to the flow characteristics of the batter.

Referring to Figs. 5 and 6, raising the rack lift piston rod 119 causes the arm 146 thereon to close switch $MS_4$ which operates piston rod 113 through the closed contacts $RC_1$ of latching relay $LR_1$ to actuate solenoid $S_5$ (Fig. 19) and advances the rack, rotating pinion 50A and inverting griddle plate 32A over plate 32B. At the end of the advance stroke of rack 112 an arm 147 on piston rod 113 actuates impulse switch $ES_3$ which operates the spatula carriage cylinder 137 to move the spatula 124 rearwardly from the chain line position to the full line position of Fig. 6 and latches relay $LR_1$, opening contacts $RC_1$ de-energizing the circuit closed by switch $MS_4$.

At the end of the stroke of the carriage, the crosshead 140 actuates the switch $MS_3$ which causes the spatula carriage to return and also returns the rack operating piston rod 113 and griddle plate 32A to normal position. Return of griddle plate 32A to upright position by return stroke of piston rod 113 actuates impulse switch $ES_4$ by arm 147 attached to piston rod 113, which lowers the rack lift piston, disengaging the rack from pinion 50A. At the end of the return stroke of the rack lift piston rod arm 146 actuates switch $MS_1$ which closes the circuit to one side of timer switch $TS_1$ in readiness to start another operating cycle when switch $TS_1$ is again closed by the timer. Closing timer switch $TS_1$ also energizes the unlatching coil in relay $LR_1$, closing contacts $RC_1$ in readiness for the next operating cycle.

If for any reason the rack lift piston has not fully returned to actuate switch $MS_1$ when the timer switch $TS_1$ again closes, the indexing cylinder will not operate to initiate another cycle. Thus, the switch $MS_1$ is a safety switch preventing damage to the apparatus if any part fails to operate properly.

The elapsed time of each operation cycle may be of the order of ten seconds, but this may be varied by adjusting the timer cams operating switches $TS_1$ and $TS_2$, as all the other operations will always be performed automatically within the cycle.

Figure 19:
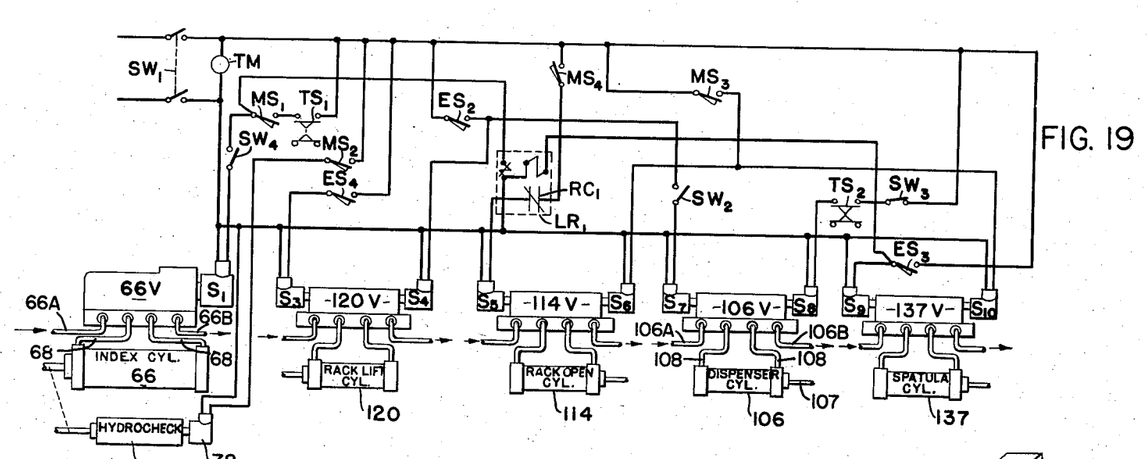
Fig. 19 is a wiring diagram showing the electrical system controlling the various switches and solenoid valves for operating the actuating devices of the machine in timed sequence.
Figure 20:
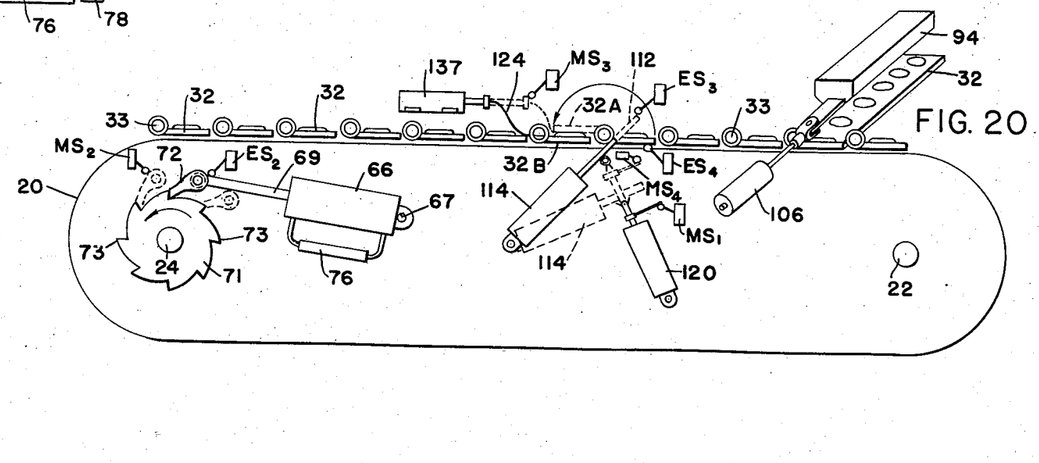
Fig. 20 is a schematic view correlating the actuating devices to the machine.

Referring to Figs. 19 and 20, when the operator closes the main line switch $SW_1$, energizing the timer motor TM, the machine will start at that position of its operation cycle where it was last stopped. Assuming that an operation cycle was completed closing $MS_1$, and that manual switch $SW_4$ is closed, the timer cam will close $TS_1$ energizing the advance solenoid $S_1$ of the solenoid valve 66V for the index cylinder 66, and advancing the conveyor one griddle plate interval. Near the end of the advance stroke of piston rod 69 switch MS₂ is closed energizing the solenoid 78 of the hydro-check and cushioning the end of the stroke.

After a predetermined time interval of, say, 1.5 seconds, TS₁ opens, de-energizing solenoid S₁ and the unbalanced pressure condition previously described within the valve 66V causes the index piston in cylinder 66 to return. During the return stroke of piston rod 69 switch ES₂ is actuated, energizing the advance solenoid S₄ of valve 120V for the rack lift cylinder 120, and simultaneously energizing advance solenoid S₇ of valve 106V for the batter dispenser cylinder, assuming manual switch SW₂ to be closed. The batter dispenser remains in advanced position until switch TS₂ is momentarily closed by the timer. Assuming manual switch SW₃ to be closed, this energizes return solenoid S₈ to return the batter dispenser.

Now, when the rack lift piston engages the rack with a pinion 50A, switch MS₄ is actuated, energizing advance solenoid S₅ of the valve 114V for the rack operating cylinder 114, inverting the griddle plate 32A. At the end of the rack advance stroke switch ES₃ is actuated, energizing advance solenoid S₉ of valve 137V for the spatula cylinder 137 and causing the spautla 124 to scrape the partially cooked cakes from inverted plate 32A, and allow them to drop onto plate 32B thereunder.

At the end of the advance stroke of the spatula switch MS₃ is actuated energizing return solenoid S₁₀ of the spatula operating valve 137V and also energizing return solenoid S6 of the rack operating cylinder. As the rack returns the griddle plate 32A to upright position it actuates return solenoid S₃ of valve 120V for the rack lift cylinder. At the end of its return stroke, the rack lift piston actuates switch MS₁, which closes the circuit to one side of switch TS₁, in readiness to start another operation cycle when switch TS₁, is again closed by the timer.

The solenoid valves 66V, 106V, 114V, 120V and 137V which control the operation of their respective fluid cylinders, may all be mounted in one central location convenient for connection to the various cylinders and control switches. Such location may be on or in the vicinity of the upright frame member 29.

The improved machine is compact and fully automatic, inexpensive to operate, flexible of adjustment with respect to the amount of cooking applied to the cakes, and capable of producing large quantities of uniformly cooked cakes per unit of time.

What is claimed is:

1. Griddle cake baking apparatus including an endless conveyor, a series of transversely extending griddle plates carried on the conveyor, means for depositing a measured charge of batter successively on each plate, means for indexing the conveyor to move the plates successively under the batter depositing means and maintain each plate thereunder a predetermined time interval, means for heating the plates as they progress step-by-step along the conveyor, means for successively turning plate after the batter thereon is cooked on one side to invert said plate over the next forwardly adjacent plate and to return said inverted plate to normal position, scraper means to free said partly cooked batter from said inverted plate whereby the party cooked batter will be deposited on the adjacent underlying plate to be advanced past the heating means to cook the other side thereof, said turning and scraping means operating in timed sequence during said predetermined time interval, and scraper means to free batter cakes cooked on both sides from successive plates.

2. Griddle cake baking apparatus including an endless conveyor, a series of transversely extending griddle plates carried on the conveyor at intervals, means at one station along the conveyor for depositing a measured charge of batter successively on each plate, means for indexing the conveyor to move the plates one at a time successively under the batter depositing means, means at an advanced station along the conveyor for successively inverting each plate over the next forwardly adjacent plate and returning said inverted plate to normal position, scraper means to free partly cooked cakes from the inverted plate to drop them onto said adjacent plate, means at an advanced station beyond said inverting station to remove fully cooked cakes from successive plates, means to maintain the plates at cooking temperature from prior to the batter depositing station to after the inverting station, and means controlled by the return stroke of the plate inverting and returning means to operate the conveyor indexing means.

3. Griddle cake baking apparatus including an endless conveyor, a series of transversely extending griddle plates carried on the conveyor at longitudinal intervals, each plate having a pivot shaft adjacent its forward edge, means for depositing a measured charge of batter successively on each plate, means for indexing the conveyor to move the plates sucessively under the batter depositing means, means for heating the plates as they progress along the conveyor, means for successively turning each plate on its pivot shaft to invert said plate over the next forwardly adjacent plate and for returning said inverted plate to normal position, scraper means to free partly cooked batter from said inverted plate, said inverting and scraping means operating in timed sequence while another plate is under the batter depositing means, means controlled by the return stroke of the plate inverting and returning means to operate the conveyor indexing means, and means to remove fully cooked batter cakes from successive plates.

4. Griddle cake baking apparatus including an endless conveyor, a series of transversely extending griddle plates carried on the conveyor at intervals, each plate having a pivot shaft adjacent its forward edge journaled on the conveyor, means for depositing a measured charge of batter successively on each plate, means for indexing the conveyor to move the plates successively under the batter depositing means, means for heating the plates as they progress along the conveyor, means at an advanced station beyond the batter depositing means for successively rotating each pivot shaft to invert its plate over the next forwardly adjacent plate and for returning said inverted plate to normal position, scraper means to free partly cooked batter from said inverted plate, said inverting and scraping operations being performed in timed sequence while another plate is under the batter depositing means, means controlled by the return stroke of the inverting and returning means to operate the conveyor indexing means, and means to remove fully cooked batter cakes from successive plates.

5. Griddle cake baking apparatus including an endless conveyor, a series of transversely extending griddle plates carried on the conveyor at intervals, advance and return stroke means for indexing the conveyor to advance it through one interval at a time equal to the spacing between the center lines of said plates, means controlled by the return stroke of the indexing means for depositing a measured charge of batter on each successive plate, means for heating the plates as they advance along the conveyor, means controlled by the return stroke of the indexing means for successively inverting each plate over the next forwardly adjacent plate at an advanced station to drop partly cooked cakes onto said adjacent plate, and reciprocable spatula means controlled by said inverting means to free the partly cooked cakes from successive inverted plates.

6. Griddle cake baking apparatus including an endless conveyor, a series of transversely extending griddle plates carried on the conveyor at intervals, advance and return stroke means for indexing the conveyor to advance it through one interval at a time equal to the spacing between the center lines of said plates, means controlled by the return stroke of the indexing means for depositing a measured charge of batter on each successive plate, means for heating the plates as they advance along the conveyor, means controlled by the return stroke of the indexing means for successively inverting each plate over the next forwardly adjacent plate at an advanced station to drop partly cooked cakes onto said adjacent plate, spatula means controlled by said inverting means to free the partly cooked cakes from successive inverted plates, and means controlled by said spatula means to return the inverted plates successively to right-side-up position.

7. Griddle cake baking apparatus including an endless conveyor, a series of transversely extending griddle plates carried on the conveyor at intervals, advance and return stroke means for indexing the conveyor to advance it through one interval at a time equal to the spacing between the center lines of said plates, means controlled by the return stroke of the indexing means for depositing a measured charge of batter on each successive plate, means for heating the plates as they advance along the conveyor, means controlled by the return stroke of the indexing means for successively inverting each plate over the next forwardly adjacent plate at an advanced station to drop partly cooked cakes onto said adjacent plate, spatula means controlled by said inverting means to free the partly cooked cakes from successive inverted plates, means controlled by said spatula means to return the inverted plates successively to right-side-up position, and means controlled by the plate returning means to operate the conveyor indexing means.

8. Griddle cake baking apparatus including an endless conveyor, a series of transversely extending griddle plates carried on the conveyor at intervals, advance and return stroke means for indexing the conveyor to advance it through one interval at a time equal to the spacing between the center lines of said plates, means controlled by the return stroke of the indexing means for depositing a measured charge of batter on each successive plate, means for heating the plates as they advance along the conveyor, means controlled by the return stroke of the indexing means for successively inverting each plate over the next forwardly adjacent plate at an advanced station to drop partly cooked cakes onto said adjacent plate, spatula means controlled by said inverting means to free the partly cooked cakes from successive inverted plates, means controlled by said spatula means to return the inverted plates successively to right-side-up position, means controlled by the plate returning means to operate the conveyor indexing means, and means operated by the advance stroke of the indexing means to remove fully cooked cakes from successive plates.

9. Griddle cake baking apparatus including an endless conveyor, a series of transversely extending griddle plates carried on the conveyor at intervals, advance and return stroke means for indexing the conveyor to advance it through one interval at a time equal to the spacing between the center lines of said plates, means controlled by the return stroke of the indexing means for depositing a measured charge of batter on each successive plate, means for heating the plates as they progress along the conveyor, means controlled by the return stroke of the indexing means for inverting the plates successively over the next forwardly adjacent plate as they reach a station where they are cooked on one side, spatula means controlled by the inverting means to free the partly cooked cakes from successive inverted plates, and means operated by the advance stroke of the indexing means to remove the cakes from successive plates as they reach a station where they are cooked on both sides.

10. Griddle cake baking apparatus including an endless conveyor, a series of transversely extending griddle plates carried on the conveyor at intervals, advance and return stroke means for indexing the conveyor to advance it through one interval at a time equal to the spacing between the center lines of said plates, means controlled by the return stroke of the indexing means for depositing a measured charge of batter on each successive plate, means for heating the plates as they progress along the conveyor, means controlled by the return stroke of the indexing means for inverting the plates successively over the next forwardly adjacent plate as they reach a station where they are cooked on one side, spatula means controlled by the inverting means to free the partly cooked cakes from successive inverted plates, means controlled by the spatula means to return the inverted plates successively to right-side-up position, and means operated by the advance stroke of the indexing means to remove the cakes from successive plates as they reach a station where they are cooked on both sides.

11. Griddle cake baking apparatus including an endless conveyor, a series of transversely extending griddle plates carried on the conveyor at intervals, advance and return stroke means for indexing the conveyor to advance it through one interval at a time equal to the spacing between the center lines of said plates, means controlled by the return stroke of the indexing means for depositing a measured charge of batter on each successive plate, means for heating the plates as they progress along the conveyor, means controlled by the return stroke of the indexing means for inverting the plates successively over the next forwardly adjacent plate as they reach a station where they are cooked on one side, a spatula adapted for scraping the surface of successive inverted plates and means controlled by said inverting means for reciprocating said spatula longitudinally of the conveyor to scrape said successively inverted plates.

12. Griddle cake baking apparatus including an endless conveyor, a series of transversely extending griddle plates carried on the conveyor at intervals, advance and return stroke means for indexing the conveyor to advance it through one interval at a time equal to the spacing between the center lines of said plates, means controlled by the return stroke of the indexing means for depositing a measured charge of batter on each successive plate, means for heating the plates as they progress along the conveyor, means controlled by the return stroke of the indexing means for inverting the plates successively over the next forwardly adjacent plate as they reach a station where they are cooked on one side, a spatula adapted for scraping the surface of successive plates in inverted position, means controlled by the inverting means for reciprocating said spatula longitudinally of the conveyor to scrape said successively inverted plates, and means controlled by the movement of said spatula to return each inverted plate to right-side-up position.

13. Griddle cake baking apparatus including an endless conveyor, a series of transversely extending griddle plates carried on the conveyor at intervals, reciprocable means for indexing the conveyor to advance it through one interval at a time equal to the spacing between the center lines of said plates, an electrical circuit controlling the operation of said indexing means, means controlled by the indexing means for depositing a measured charge of batter on each successive plate, means for heating the plates as they progress along the conveyor, means for inverting the plates successively over the next forwardly adjacent plate when the cakes are cooked on one side and returning the plates successively to right-side-up position, and control means in the electrical circuit to the indexing means, said control means operated by the plate inverting and returning means.

14. Griddle cake baking apparatus including an endless conveyor, a series of transversely extending griddle plates carried on the conveyor at intervals, reciprocable means for indexing the conveyor to advance it through one interval at a time equal to the spacing between the center lines of said plates, an electrical circuit controlling the operation of said indexing means, means controlled by the indexing means for depositing a measured charge of batter on each successive plate, means for heating the plates as they progress along the conveyor, means for inverting the plates successively over the next forwardly adjacent plate when the cakes are cooked on one side, spatula means controlled by the inverting means to free the partly cooked cakes from successive plates in inverted position, said inverting means adapted to return the inverted plates successively to right-side-up position, and control means in the electrical circuit to the indexing means, said control means operated by the plate returning operations.

References Cited in the file of this patent

UNITED STATES PATENTS

| | | |
|---|---|---|
| 1,229,946 | Gutierrez | June 12, 1917 |

FOREIGN PATENTS

| | | |
|---|---|---|
| 321,805 | Great Britain | Nov. 21, 1929 |
| 692,917 | Great Britain | June 17, 1953 |

UNITED STATES PATENT OFFICE
CERTIFICATE OF CORRECTION

Patent No. 2,899,914                                            August 18, 1959

Fred C. Van Arsdell

It is hereby certified that error appears in the printed specification of the above numbered patent requiring correction and that the said Letters Patent should read as corrected below.

Column 1, line 53, for "These and other drawings" read -- These and other objects --; column 4, line 36, after "cylinder." insert the sentence -- Referring to Fig. 19, solenoid valve 66V has pressure fluid inlet pipe 66A and outlet pipe 66B, and has a piston controlling flow selectively through suitable pipes 68 to and from cylinder 66, and the piston is actuated in one direction by energizing solenoid $S_1$. --; column 6, line 36, for "outlet pipes 160A and 160B" read -- outlet pipes 106A and 106B --; column 9, line 25, for "spautla" read -- spatula --; line 31, for "S6" read -- $S_6$ --; line 58, for "turning plate after" read -- turning each plate after --; line 63, for -- party cooked batter" read -- partly cooked batter --; column 10, line 6, for "the inverted plate" read -- said inverted plate --.

Signed and sealed this 23rd day of February 1960.

(SEAL)
Attest:
KARL H. AXLINE
Attesting Officer

ROBERT C. WATSON
                                                                          Commissioner of Patent